J. H. HAMER.
SHOCK ABSORBER.
APPLICATION FILED JULY 8, 1919.
1,352,955.
Patented Sept. 14, 1920.
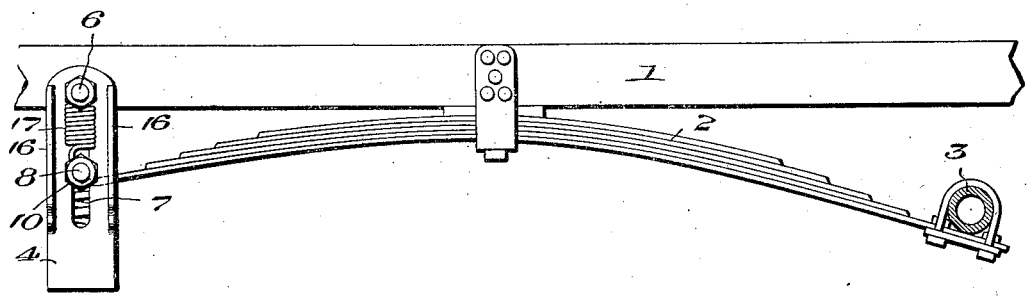
Fig. 1.
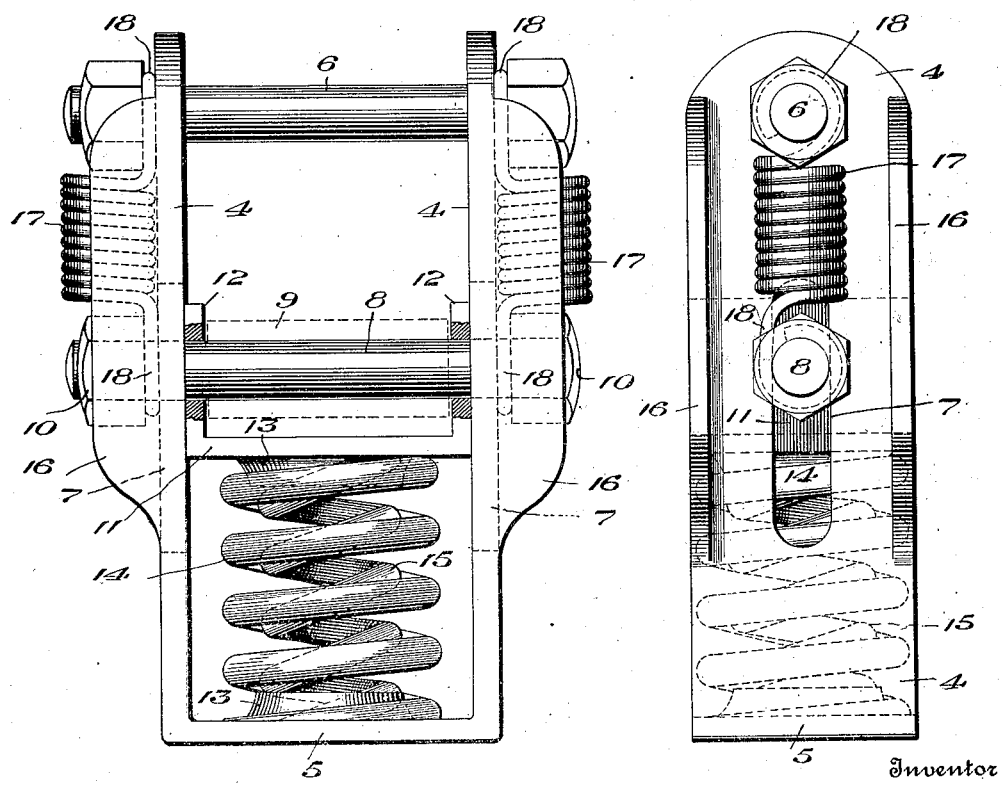
Fig. 2.
Fig. 3.
Witness
Philip E. Barnes
Inventor
John H. Hamer,
By Langdon Moore, Attorney

UNITED STATES PATENT OFFICE.

JOHN H. HAMER, OF WARSAW, OHIO.

SHOCK-ABSORBER.

1,352,955. Specification of Letters Patent. Patented Sept. 14, 1920.

Application filed July 8, 1919. Serial No. 309,418.

*To all whom it may concern:*

Be it known that I, JOHN H. HAMER, a citizen of the United States, residing at Warsaw, in the county of Coshocton and State of Ohio, have invented certain new and useful Improvements in Shock-Absorbers, of which the following is a specification, reference being had therein to the accompanying drawing.

This invention relates to a shock absorber. While its application is unrestricted, it is especially useful in connection with spring suspensions for vehicles and the like.

It is contemplated among the objects of the invention to provide a combined spring link and shock absorber wherein the link or means for attaching the vehicle spring to the body of the vehicle is utilized to house and carry auxiliary spring or shock absorbing instrumentalities, the arrangement being such that the shock absorbing means are compactly housed, protected from accidental bumping or injury; wherein the parts are few and readily assembled and dismounted; and which will, in a word, provide a neat, practical device for this purpose.

Other objects and advantages will in part be apparent, and in part be brought out more fully in the description which follows.

A drawing illustrating an embodiment of the invention is hereto annexed, the following views being shown:—

Figure 1 is a view in side elevation illustrating a use of the device in connection with a vehicle spring;

Fig. 2, is a detail view in end elevation; and

Fig. 3, is a similar view in side elevation.

Referring specifically to the drawings, 1 designates a portion of a vehicle body such as the frame. To this there is secured as by a shackle, a spring 2, one end of which is here shown supporting an axle 3. The device comprising the present invention is adapted to act as a spring link and shock absorber and to be associated with the vehicle spring. As here shown it comprises a yoke including spaced-apart side members 4, connected together by a base 5. For the purpose of securing the yoke to a vehicle body the sides may be provided with openings for the reception of securing means, a bolt 6 being here shown.

Means are provided for guiding and limiting the movement of the vehicle spring within the yoke and to this end there are slots 7 disposed, one on each side of the yoke. Within these slots there is disposed means for connecting the yoke to the vehicle spring. As here shown this comprises a bolt 8 passing through an eye 9 of the spring. This bolt extends through the slot in each side of the yoke and has heads 10 on the outer portions of the sides.

Shock absorbing means are associated with the yoke and means are provided for confining and compressing the shock absorbers. As here shown there is a plate 11, having angulated portions 12, disposed within and bearing upon the sides of the yoke. These angulated portions are provided with openings through which the bolt 8 passes, being confined between the eye 9 of the vehicle spring and the sides of the yoke. The plate 11 and the base 5 are provided with projections 13 for the purpose of securing and retaining the shock absorbing instrumentalities. These as here shown, comprise spring members 14 and 15. They may be arranged one within the other and may be of varying resiliency. One may be loosely set between the plates to aid in absorbing downward shocks and the other may be secured to both plates for the purpose of taking up rebound.

Auxiliary shock absorbing means may be provided and means are here shown for housing and protecting such means. Upon each side of the yoke there are ears or lugs 16 extending outwardly from the sides. These protect springs 17 having eyes 18 confined between the sides of the yoke and the bolt heads.

In addition to the shock absorbing means described, there may be a frictional resistance set up between the extensions 12 and the sides of the yoke by tightening up on the bolt 8, and while the invention is set forth in the embodiment herein presented it will be understood that many changes in the arrangement of the parts may be made without departing from the scope of the invention as set forth in the claim.

What I claim is:—

A combined link and shock absorbing instrumentality comprising a yoke member having spaced-apart sides; a base connecting said sides; said sides being provided with slotted openings; a bolt passing through the slotted openings and adapted to connect a vehicle spring to the yoke; a plate having angulated extensions bearing on the sides and provided with openings through which the bolt passes; shock absorbing means confined between the plate and yoke; ears disposed on the sides and extending outwardly therefrom to constitute a housing; auxiliary shock absorbing means disposed therein; and means for creating a varying frictional resistance between the angulated extensions of the compressing member and the sides of the yoke.

In testimony whereof I affix my signature.

JOHN H. HAMER.